(12) United States Patent
Machani

(10) Patent No.: US 9,607,139 B1
(45) Date of Patent: Mar. 28, 2017

(54) MAP-BASED AUTHENTICATION

(71) Applicant: EMC Corporation, Hopkinton, MA (US)

(72) Inventor: Salah Machani, Thornhill (CA)

(73) Assignee: EMC IP Holding Company LLC, Hopkinton, MA (US)

( * ) Notice: Subject to any disclaimer, the term of this patent is extended or adjusted under 35 U.S.C. 154(b) by 531 days.

(21) Appl. No.: 14/227,550

(22) Filed: Mar. 27, 2014

(51) Int. Cl.
G06F 21/36 (2013.01)
G06F 21/32 (2013.01)
H04L 9/32 (2006.01)
H04L 29/06 (2006.01)

(52) U.S. Cl.
CPC ............. *G06F 21/36* (2013.01); *G06F 21/32* (2013.01); *H04L 9/3226* (2013.01); *H04L 63/0861* (2013.01)

(58) Field of Classification Search
CPC .... H04L 9/3226; H04L 63/0861; G06F 21/32
See application file for complete search history.

(56) References Cited

U.S. PATENT DOCUMENTS

2007/0150842 A1* 6/2007 Chaudhri ............ G06F 3/04883 715/863
2012/0327009 A1* 12/2012 Fleizach ............. G06F 3/04883 345/173
2013/0061045 A1* 3/2013 Kiefer .................. H04L 9/0819 713/160
2013/0311916 A1* 11/2013 Weng ................... G01C 21/005 715/764
2014/0033326 A1* 1/2014 Chien .................. H04W 12/08 726/28
2014/0157210 A1* 6/2014 Katz ....................... G06F 3/017 715/863
2014/0267084 A1* 9/2014 Krulce ................. G06F 3/0416 345/173
2015/0363070 A1* 12/2015 Katz ....................... G06F 3/017 715/852

* cited by examiner

*Primary Examiner* — Arvin Eskandarnia
(74) *Attorney, Agent, or Firm* — Ryan, Mason & Lewis, LLP

(57) ABSTRACT

Methods, apparatus and articles of manufacture for map-based authentication are provided herein. A method includes establishing a set of cryptographic information, wherein said set of cryptographic information comprises (i) at least one graphical-based input element and (ii) one or more graphical-based input sub-elements derived from said at least one graphical-based input element, wherein said at least one graphical-based input element comprises at least one given map and wherein said one or more graphical-based input sub-elements comprise one or more points of interest on said at least one given map; generating a prompt via a computing device interface in connection with an authentication request to access a protected resource associated with the computing device; processing input cryptographic information entered via the computing device interface in response to the prompt against the set of cryptographic information; and resolving the authentication request based on said processing.

20 Claims, 11 Drawing Sheets

MAP-BASED AUTHENTICATION

FIELD

The field relates generally to cryptography, and more particularly to authentication techniques.

BACKGROUND

In recent years, there has been growth in the area of touch-screen computing devices facilitated by various applications which rely heavily on multi-touch gestures. Additionally, the growing use of touch-screens has made gesture-based authentication methods an attractive alternative to text-based passwords for such devices. By way of example, existing gesture-based authentication approaches include picture-based authentication techniques. However, picture-based authentication techniques commonly lead to user selection of poor quality or low entropy pictures with very few points of interests (POIs), often resulting in obviousness and/or predictability, and ultimately, in a lower level of security.

Accordingly, a need exists for gesture-based authentication techniques that provide enhanced security capabilities while maintaining an ease-of-use aspect.

SUMMARY

One or more illustrative embodiments of the present invention provide map-based authentication. In accordance with an aspect of the invention, a method is provided comprising the steps of: establishing a set of cryptographic information, wherein said set of cryptographic information comprises (i) at least one graphical-based input element and (ii) one or more graphical-based input sub-elements derived from said at least one graphical-based input element, wherein said at least one graphical-based input element comprises at least one given map and wherein said one or more graphical-based input sub-elements comprise one or more points of interest on said at least one given map; generating a prompt via a computing device interface in connection with an authentication request to access a protected resource associated with the computing device; processing input cryptographic information entered via the computing device interface in response to the prompt against the set of cryptographic information; and resolving the authentication request based on said processing.

In accordance with another aspect of the invention, a method is provided including the step of identifying multiple graphical-based input elements to be associated with a computing device in response to user activity in connection with the computing device, wherein said multiple graphical-based input elements comprise multiple maps. The method also includes displaying the multiple graphical-based input elements via an interface of the computing device and generating a first prompt via the computing device interface. Further, the method includes processing a first input of cryptographic information entered via the computing device interface in response to the first prompt against the multiple graphical-based input elements, wherein said processing comprises establishing a given map from the multiple maps to be used in connection with an authentication request to access a protected resource associated with the computing device. The method additionally includes displaying the given map via the computing device interface and generating a second prompt via the computing device interface. Further, the method includes processing a second input of cryptographic information entered via the computing device interface in response to the second prompt against the given map, wherein said processing comprises establishing one or more points of interest on the given map to be used in connection with the authentication request to access the protected resource associated with the computing device, wherein the authentication request is to be granted if cryptographic information input in response to the authentication request matches the given map and the one or more points of interest on the given map.

The authentication techniques of the illustrative embodiments overcome one or more of the problems associated with the conventional techniques described previously, and provide enhanced entropy while maintaining ease-of-use. These and other features and advantages of the present invention will become more readily apparent from the accompanying drawings and the following detailed description.

DETAILED DESCRIPTION

Figure 1:
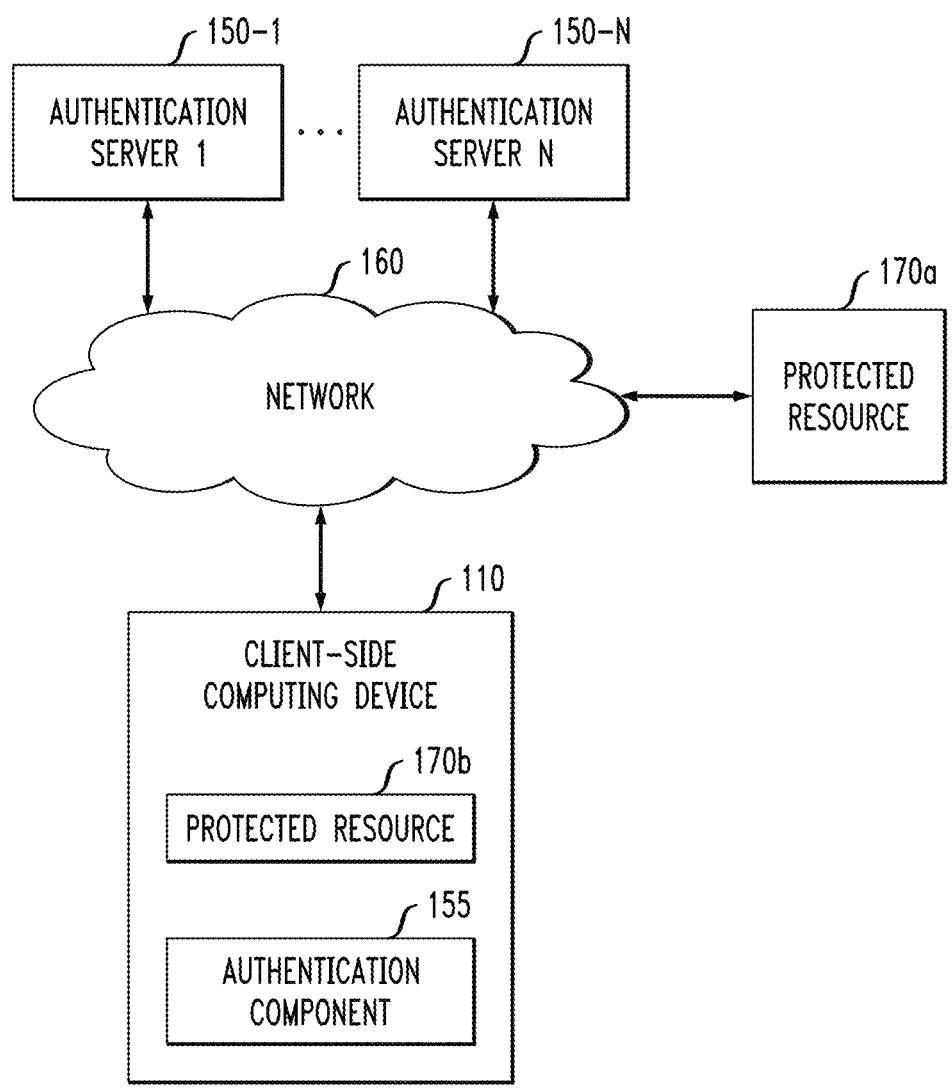
FIG. 1 is a diagram illustrating an example network environment in which one or more embodiments of the present invention can operate.

As will be described, the present invention, in one or more illustrative embodiments, provides map-based authentication techniques on touch-screen-based devices. Accordingly, in at least one embodiment of the invention, graphical-based maps such as city maps, subway maps, and/or other types of maps are utilized via a computing device screen or interface. As detailed herein, maps commonly provide a large number of unique POIs, and at least one embodiment of the invention includes translating a selection of one or more of such POIs into a password that can be used for authentication purposes.

In at least one embodiment of the invention, POIs can be selected from one or more areas of a map, and such selection can be input in a specific sequence or in a random sequence, provided all registered password POIs are entered. During enrollment, a user can choose from a pool of available maps displayed and/or listed via a computing device screen or interface. The password can then be generated by touching the screen to pinpoint and/or identify one or more POIs on the chosen map. As detailed herein, a POI can include one of multiple items such as a particular place or venue (a restaurant, a bar, a museum, etc.), an intersection, a building, a transit station, etc. Additionally, as also further described herein, a user can zoom-in on one or more portions of a presented map graphic as needed or desired to navigate to a given POI or specific area within the map.

Illustrative embodiments of the present invention will be described herein with reference to exemplary communication systems and associated processing devices. It is to be appreciated, however, that the invention is not restricted to use with the particular illustrative system and device configurations shown.

Accordingly, the term communication system, as used herein, is intended to be broadly construed so as to encompass any type of system in which multiple processing devices can communicate with one another. Also, the term computing device, as used herein, is intended to be construed broadly so as to encompass any type of processing device that incorporates, among other things, cryptographic functionality (such as a computer, tablet, server, mobile telephone or device, smart phone, radio-frequency identification (RFID) tag or reader, authentication token, etc.). Similarly, the term authentication server should be understood to encompass any type of processing device or set of such devices that is operative to authenticate a password provided by an authentication token or other type of computing device. As used herein, an authentication server need not be a network-based server, and may be implemented as a portion of a device that performs other functions, as a combination of multiple servers or other devices, or in other forms.

As described herein, in accordance with at least one embodiment of the invention, cryptographic information can include input elements (for example, POIs within the context of a given map) selected from local memory on a user mobile device, selected from a cloud storage service, derived from the Internet, etc. Additionally, in such an embodiment, some form of a digest derived from the input elements will be stored for user verification purposes. Also, if an encryption key is derived from the input elements, and depending on the key derivation function, a salt may be stored as well.

FIG. 1 illustrates an example client-side computing device (CSCD) 110 communicating with a protected resource 170a over a network 160. As detailed further below, at least one embodiment of the invention can also include a CSCD 110 that includes a protected resource 170b residing thereon. In an example implementation, a user authenticates online with one or more authentication servers 150-1 through 150-N (hereinafter, collectively referred to as authentication servers 150) before obtaining access to protected resource 170a and/or 170b (hereinafter, collectively referred to as protected resource 170 unless otherwise specified). Additionally, in an alternative example embodiment, a user authenticates offline and/or locally on the CSCD 110 via an authentication component 155 resident on the device.

As indicated above, in at least one example embodiment of the invention described herein, a CSCD 110 can include a mobile device such as a mobile phone, a smart phone, a tablet, etc. Additionally, as depicted in FIG. 1, the network 160, may comprise, for example, a global computer network such as the Internet, a wide area network (WAN), a local area network (LAN), a satellite network, a telephone or cable network, or various portions or combinations of these and other types of networks.

According to one aspect of the invention, as noted above, the user of the CSCD 110 is authenticated by authentication servers 150 using a password (or other form of cryptographic information). The exemplary communications among the system elements 110, 150 and 170 of FIG. 1 to achieve joint authentication by the authentication servers 150 is discussed further below.

It is to be appreciated that a given embodiment of the disclosed system may include multiple instances of CSCD 110 and protected resource 170, and possibly other system components, although only single instances of such components are shown in the simplified system diagram of FIG. 1 for clarity of illustration.

As noted, the CSCD 110 may represent a portable device, such as a mobile telephone, personal digital assistant (PDA), wireless email device, game console, etc. The CSCD 110 may alternatively represent a desktop or laptop personal computer (PC), a microcomputer, a workstation, a mainframe computer, a wired telephone, a television set top box, or any other information processing device which can benefit from the use of cryptographic techniques in accordance with the invention.

The CSCD 110 may also be referred to herein as simply a "user." The term "user," as used in this context, should be understood to encompass, by way of example and without limitation, a user device, a person utilizing or otherwise associated with the device, or a combination of both. An operation described herein as being performed by a user may therefore, for example, be performed by a user device, a person utilizing or otherwise associated with the device, or by a combination of both the person and the device. Similarly, a password or other cryptographic information described as being associated with a user may, for example, be associated with a CSCD device 110, a person utilizing or otherwise associated with the device, or a combination of both the person and the device.

As also depicted in FIG. 1, the authentication servers 150 are typically associated with a third party entity, such as an authentication authority, that processes authentication requests on behalf of web servers and other resources, as well as verifies the cryptographic information that is presented by a CSCD 110.

Further, the protected resource 170 may be, for example, an access-controlled application, web site or hardware device. In other words, a protected resource 170 is a resource that grants user access responsive to an authentication process, as will be described in greater detail below. For example, protected resource 170a may include an access controlled file, e-mail, a protected application, a remote application server such as a web site or other software program or hardware device that is accessed by the CSCD 110 over a network 160.

Additionally, in at least one embodiment of the invention, protected resource 170b can include one or more applications or data residing on the CSCD 110 itself. For example, such a protected resource 170b can include access to a mobile data management container for launching applications on the CSCD 110 (such as a mobile device), which can be protected requiring a successful token-based authentication in order to run the application(s) protected by the container. Further, protected resource 170b could also include an access controlled file, e-mail, a protected application, a remote application server such as a web site or other software program or hardware device that is accessed by the CSCD 110 over a network 160. Similarly, it is possible that in order to unlock the mobile platform to perform operations, a successful authentication with the security token might be required.

As described herein, at least one embodiment of the invention provides a map-based authentication scheme that enables a user to select one or more POIs within one or more maps presented via a computing device touch screen or interface to create a user password for authentication and/or user verification.

Contrary to a static photograph-based method, which provides the possibility of leaving imprints of the password gesture on the screen which can be subsequently used by attackers, a map-based authentication method such as described herein does not leave imprints of significant usefulness for potential smudge attacks. As detailed herein, zooming-in and navigating to an area on a map results in POIs being positioned on different locations on screen. Accordingly, after multiple authentication attempts, imprints will be spread out on the screen, creating an extreme challenge to the prospect of tracing the POI-related password on the map.

Figure 2:
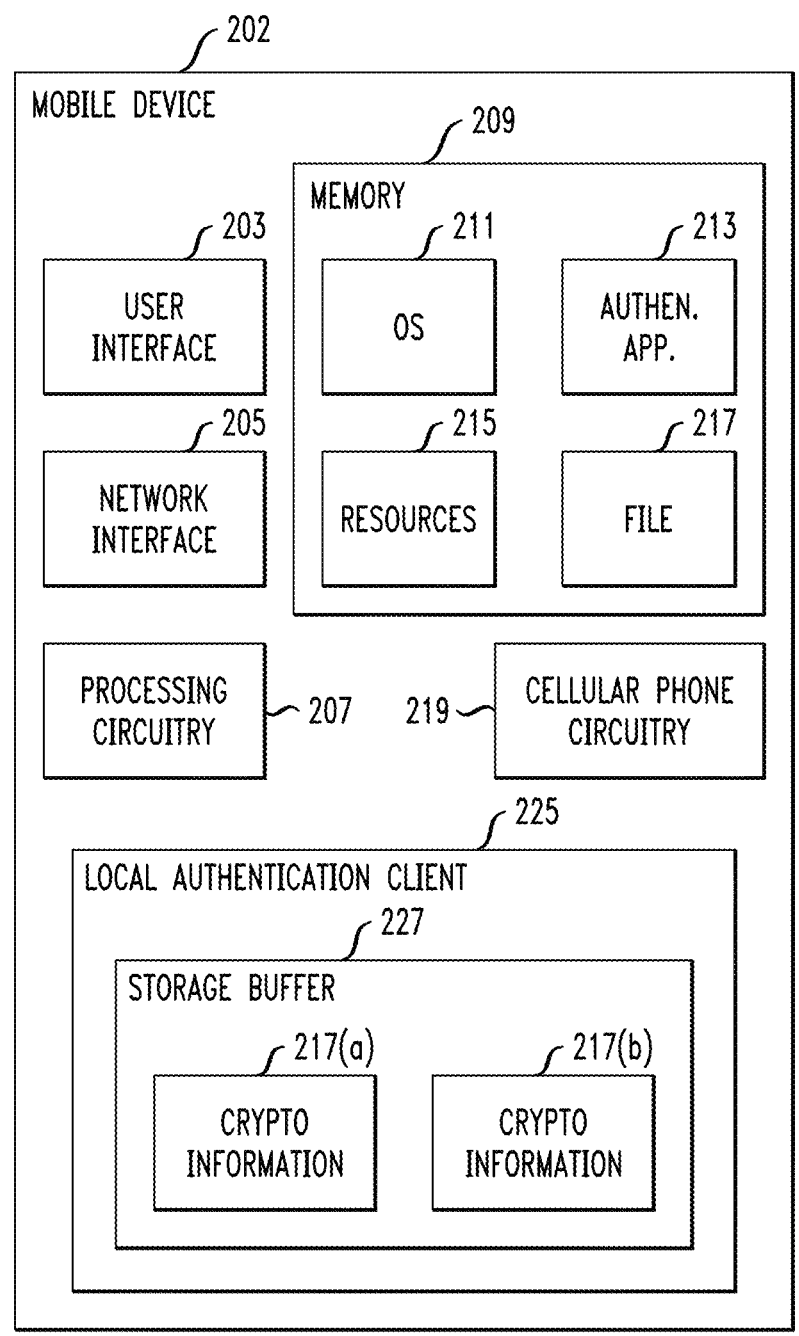
FIG. 2 is a system diagram of an exemplary mobile device on which at least one embodiment of the invention can be implemented.

FIG. 2 is a system diagram of an exemplary mobile device 202 on which at least one embodiment of the invention can be implemented. By way of illustration, FIG. 2 depicts a network interface 205 of the mobile device 202 configured to connect the mobile device 202 to a communications medium such as, for example, Wi-Fi and/or cellular telephony. Accordingly, the network interface 205 enables the mobile device 202 to communicate with the other components of an electronic environment. Additionally, the mobile device 202 includes a user interface 203 configured to receive user input and provide user output, such as a data file and/or data file location selection(s), such as described herein. One or more embodiments of the invention can include components such as a display screen, a capacitive touch display, and a push-button keyboard implemented for use in connection with the user interface 203.

Additionally, for completeness, cellular phone circuitry 219 within mobile device 202 allows the user to establish cellular phone calls with other callers having remote devices, as would be appreciated by one skilled in the art.

The memory 209 of mobile device 202 is configured to store one or more software constructs including, for example, an operating system 211, an authentication application 213, data for protected resources 215 (documents, restricted applications, etc.), a cryptographic information file 217, as well as other suitable or relevant material. Further, the processing circuitry 207 of mobile device 202 is configured to operate in accordance with the software constructs stored in the memory 209. By way of example, when the processing circuitry 207 runs the operating system 211, the processing circuitry 207 provides a secure electronic platform on which a user is able to carry out work. Such an electronic platform is capable of operating, for example, as a container to protect data and requiring user authentication before permitting access. Further, when the processing circuitry 207 runs the authentication application 213, the processing circuitry 207 communicates with the local authentication client 225 in a secure manner, for example, to obtain cryptographic information 217(a), 217(b), etc. from storage buffer 227, as additionally described herein.

It should be appreciated that the processing circuitry 207 can include one or more processors running specialized software components, such as detailed in connection with the techniques detailed herein and further depicted in FIG. 3.

In at least one embodiment of the invention, once the mobile device 202 is able to obtain valid cryptographic information, the user of the mobile device 202 is able to perform local user authentication to access protected resources. Accordingly, as noted, the mobile device 202 is provisioned with the authentication application 213 and cryptographic information file 217 holding pre-determined cryptographic information. For example, and as further detailed in connection with FIG. 3, such pre-determined cryptographic information can include one or more input elements (such as one or more maps selected from a collection of maps) and one or more input sub-elements (such as one or more POIs identified in the one or more maps). As further described herein, such cryptographic information can be learned and updated over time.

Consequently, the processing circuitry 207 of the mobile device 202 can perform a local cryptographic operation using cryptographic information 217 stored in the memory 209. In at least one embodiment of the invention the processing circuitry 207 runs the authentication application 213, which directs the user of the mobile device 202, via the user interface 203, to enter cryptographic information which is captured as one or more input elements 217(a). Additionally, the processing circuitry 207, via a software component resident thereon, can process input and output information, such as, for example, associated with an enrollment process of selecting one or more input sub-elements 217(b) to be used in conjunction with the one or more input elements 217(a). While the captured cryptographic information 217(a) and 217(b) are temporarily stored in the storage buffer 227 of the local authentication client 225, the authentication application 213 compares the captured user-provided cryptographic information 217(a) and 217(b) with the appropriate expected items of cryptographic information from file 217.

If a match is determined via this comparison, the authentication application 213 permits the user to access a protected resource (such as, for example, data in association with element 215 that are stored in the memory 209).

Figure 3:
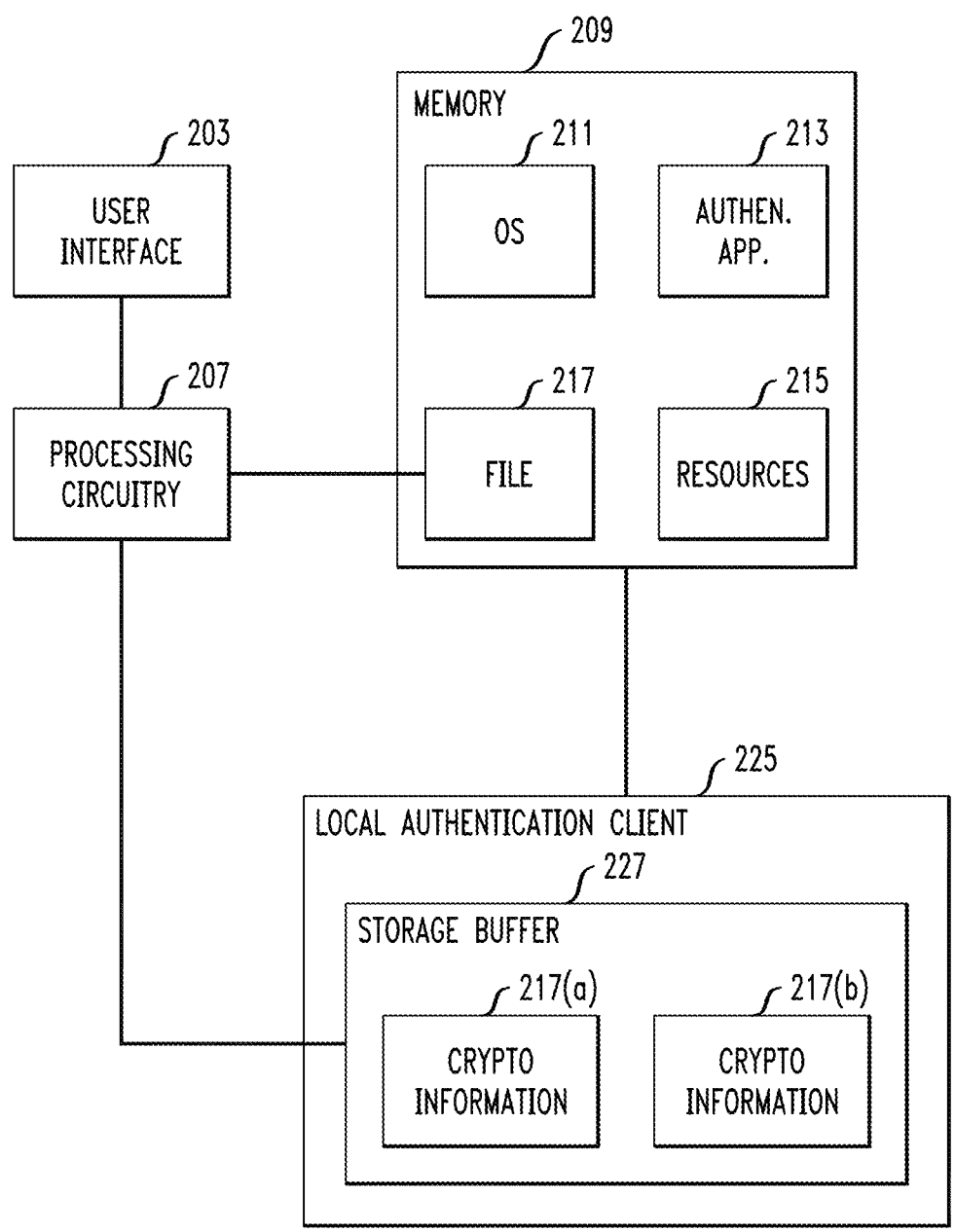
FIG. 3 is a system diagram of exemplary mobile device components, in accordance with at least one embodiment of the invention.

FIG. 3 is a system diagram of exemplary mobile device components, in accordance with at least one embodiment of the invention. As depicted in FIG. 3, a user can enter cryptographic information via user interface 203. This entered cryptographic information is captured as one or more input elements 217(a) and one or more input sub-elements 217(b). Such input elements can include one or more maps selected from a collection of maps (displayed or listed via the user interface 203) and such input sub-elements can include one or more POIs identified in the one or more input elements (maps). Upon being entered via the user interface 203, at least one embodiment of the invention can additionally include measuring input behavior via the processing circuitry 207, wherein such input behavior is associated with the input of 217(a) and 217(b) and can be learned and/or incorporated as part of the authentication mechanism, such as further described herein.

Accordingly, the captured one or more input elements 217(a) and input sub-elements 217(b) can be stored in cryptographic information file 217 as the "pre-determined" cryptographic information for a given cryptographic process (such as authentication and/or user verification).

Consequently, a corresponding cryptographic flow (carried out, for example, by authentication application 213 as run by operating system 211) can take the following exemplary form. The user is prompted (via user interface 203) to enter cryptographic information in connection with an authentication request to access a protected resource associated with the mobile device (for example, the user wishes to access and/or unlock his or her smart phone). The entered cryptographic information is captured by the processing circuitry 207 as one or more input elements 217(a) and corresponding one or more input sub-elements 217(b), and both 217(a) and 217(b) are temporarily stored in the storage buffer 227 of the local authentication client 225.

Subsequently, the authentication application 213 compares the captured user-provided cryptographic information 217(a) and 217(b) with the pre-determined cryptographic information from file 217 stored in memory 209. If the user-entered input elements 217(a) match those stored in file 217 (in the sequence and/or manner proscribed by the data stored in file 217), and if the one or more input sub-elements 217(b) corresponding to input elements 217(a) also match those stored in file 217 (also in the sequence and/or manner proscribed by the data stored in file 217), authentication is deemed successful and the user is granted access to the protected resource in question.

As described herein, at least one embodiment of the invention includes an enrollment aspect. To enroll or register a password, a user first selects a map from an available and/or presented collection of maps. The collection of maps can include, for example, municipal maps, regional maps, country maps and/or world maps. After a map is selected from the collection, the user identifies one or more desired POIs on the map. Such an identification can be carried out, for example, via tapping or touching one or more portions of the device interface that correspond to the one or more desired POIs on the displayed map. One or more embodiments of the invention can include enrolling any number of POIs on a selected map, and it is to be appreciated that a required number of POIs may vary as dictated by password policies or user preferences. Similarly, at least one embodiment of the invention includes encompassing multiple iterations of the map and POI selection process; that is, such an embodiment can include enrolling one or more ROIs in connection with a first selected map as well as one or more separate ROIs in connection with a second selected map.

Additionally, to enroll or register a newly created password (that is, a selection of one or more ROIs in connection with a map for authentication uses), at least one embodiment of the invention can include requiring the user to select the given map and POIs one or more additional times. Further, one or more embodiments of the invention also includes recording the order in which the POIs are selected and incorporating said order as part of the created password.

Figure 4:
FIG. 4 is a diagram illustrating map-based authentication, according to an example embodiment of the invention.

As described herein, at least one embodiment of the invention includes an authentication aspect. FIG. 4 is a diagram illustrating map-based authentication, according to an example embodiment of the invention. By way of illustration, FIG. 4 depicts a first view 402a of a selected map, as would be presented to a user via an interface of a computing device (such as a mobile phone or tablet). In the example depicted in FIG. 4, a city view 402a is displayed (in response to user selection or as an application default, for instance).

Figure 5:
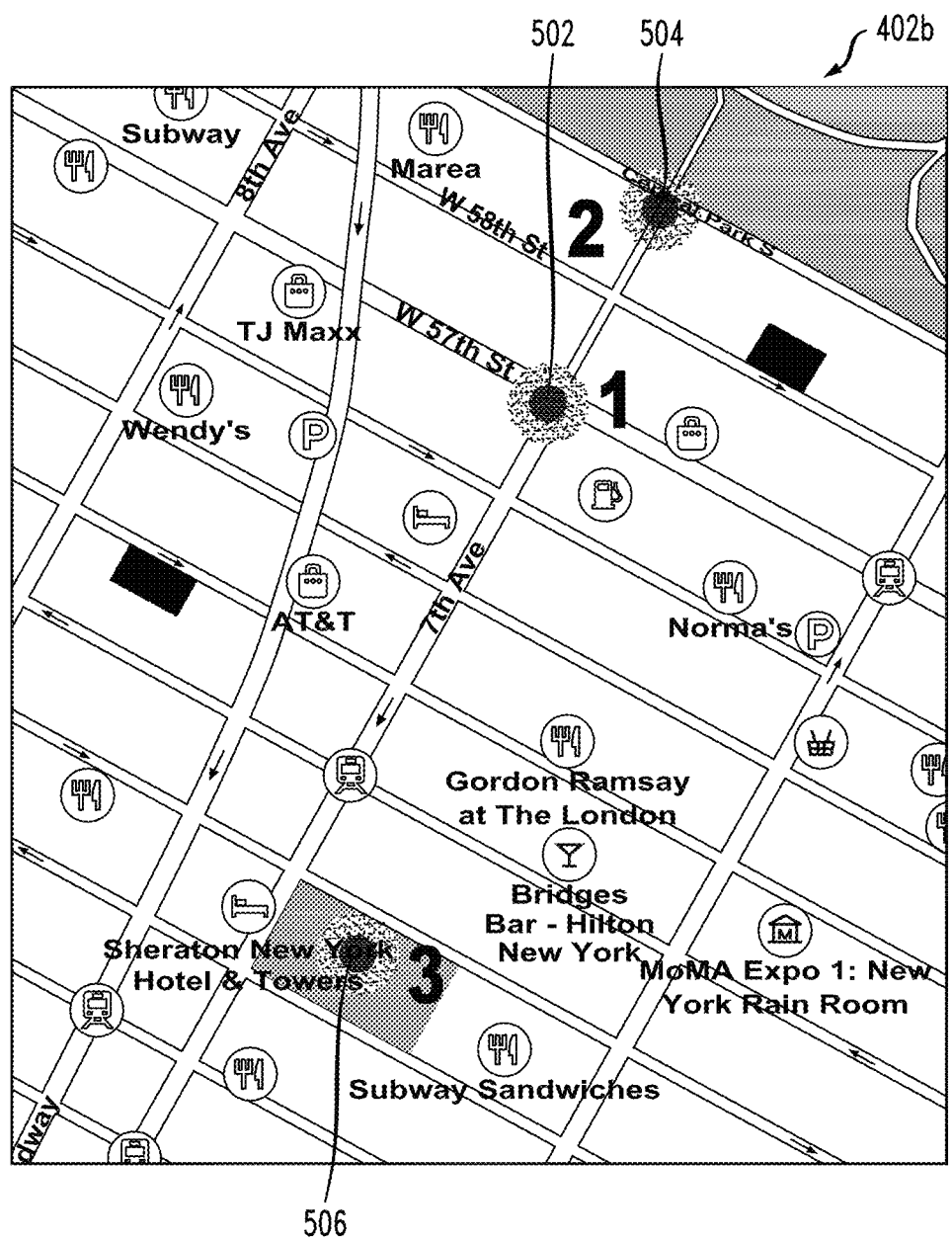
FIG. 5 is a diagram illustrating map-based authentication, according to an example embodiment of the invention.

Additionally, FIG. 5 is a diagram illustrating map-based authentication, according to an example embodiment of the invention. By way of illustration, FIG. 5 depicts a second view 402b of the selected map. In the example depicted in FIG. 5, a street grid view 402b is displayed (to a user via an interface of a computing device) in response to user selection and/or user manipulation of the first view 402a (as depicted in FIG. 4). For example, and as detailed additionally herein, a user can manipulate a given map by zooming-in on the displayed map to generate a more narrowly-tailored or focused scope and/or navigate to a given area on the map.

Figure 6:
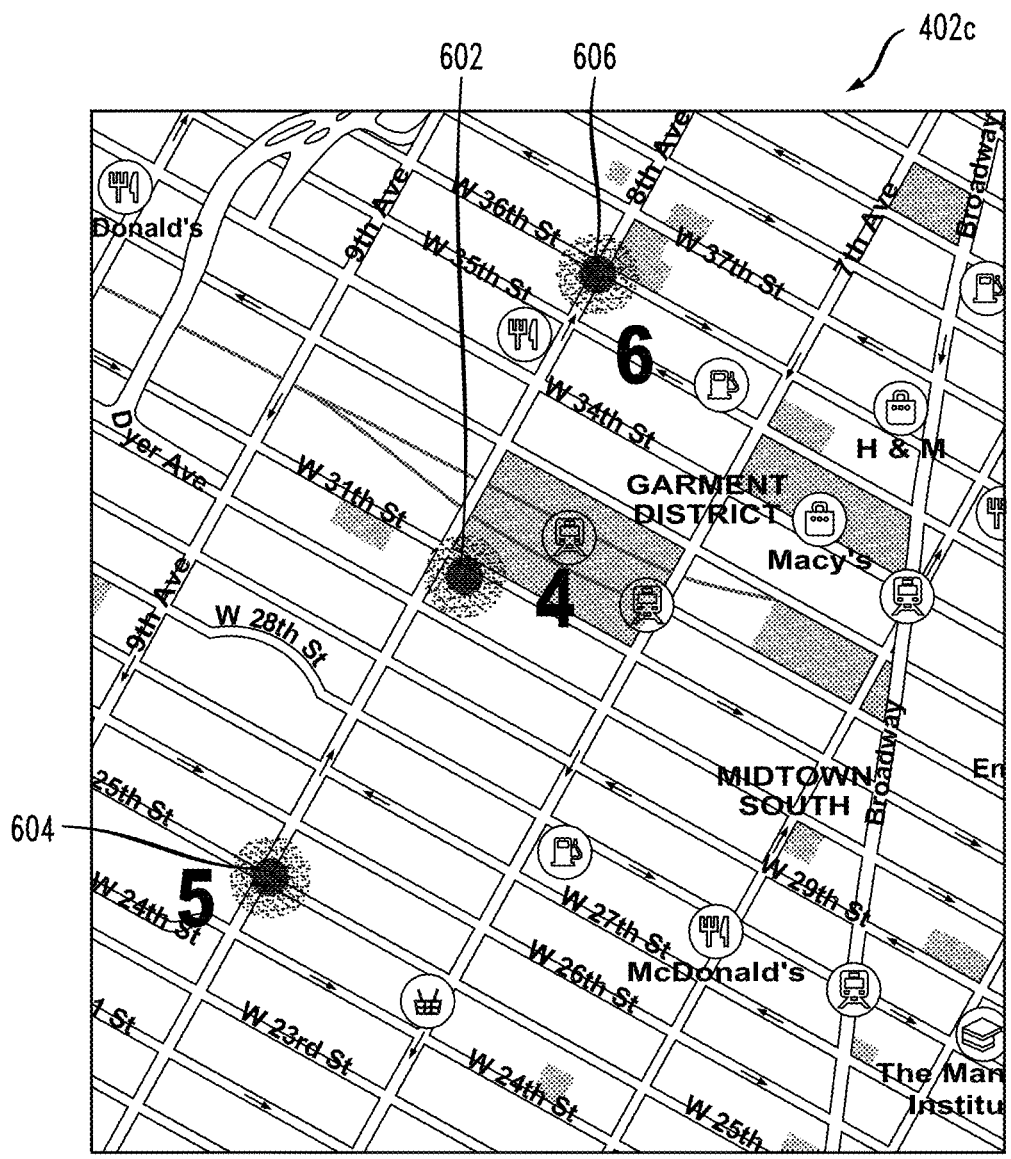
FIG. 6 is a diagram illustrating map-based authentication, according to an example embodiment of the invention.

As also illustrated, FIG. 5 depicts three POIs, namely, POI 502, POI 504 and POI 506, that have been highlighted and/or selected by the user within this view 402b of the selected map. Similarly, FIG. 6 is a diagram illustrating map-based authentication, according to an example embodiment of the invention. FIG. 6 depicts a second street grid view 402c associated with the city view 402a of the selected map, wherein three additional POIs, namely, POI 602, POI 604 and POI 606, have been highlighted and/or selected by the user. As represented via view 402c, in at least one embodiment of the invention, a user can navigate to more than one area of a selected map and select (additional) POIs. It should also be noted that one or more embodiments of the invention can include randomly generating a selection of POIs on a given map.

In accordance with an aspect of the invention, once all POIs have been selected (either randomly or manually via a user), the verification process can be initiated based on the selection(s).

As noted, at least one embodiment of the invention includes incorporating a zoom-in feature, which can affect both usability and security of the noted techniques. By way of example, a user can zoom-in to a selected or given map and navigate left, right, up, down or a combination thereof as needed or desired to reach a registered or desired POI. The number of zoom-ins required to reach a POI can be controlled and/or limited by the amount of detail displayed at each level and/or user preference.

The entropy encompassed by one or more embodiments of the invention can depend, for example, on the quality of the maps available for use as well as the particular POIs selected during enrollment. Generally, the larger and more convoluted the map is, the more entropy that map can provide. By way merely of example, a city such New York, for instance, offers more than 18,000 restaurants. As such, if an example embodiment were to only consider restaurants as potential POIs for passwords, and the user wishes to or is required (via a relevant security policy, for example) to select a password of three preferred restaurants, the estimated entropy encompassed therein would be more than 42 bits. If the password were to include six preferred restaurants, the entropy would be approximately 84 bits.

By way of yet another example, a map of a city subway system such as the London Underground includes 270 stations. Accordingly, a password of three stations out of those 270 stations would produce an entropy of 24 bits, while a password of six stations would produce an entropy of 48 bits. As also described herein, at least one embodiment of the invention includes enhancing entropy and/or usability by incorporating user gestures other than isolated selection of a POI (such as a tap of the screen or interface), wherein such gestures can include, for example, a continuous line connecting two or more POIs.

Figure 7:
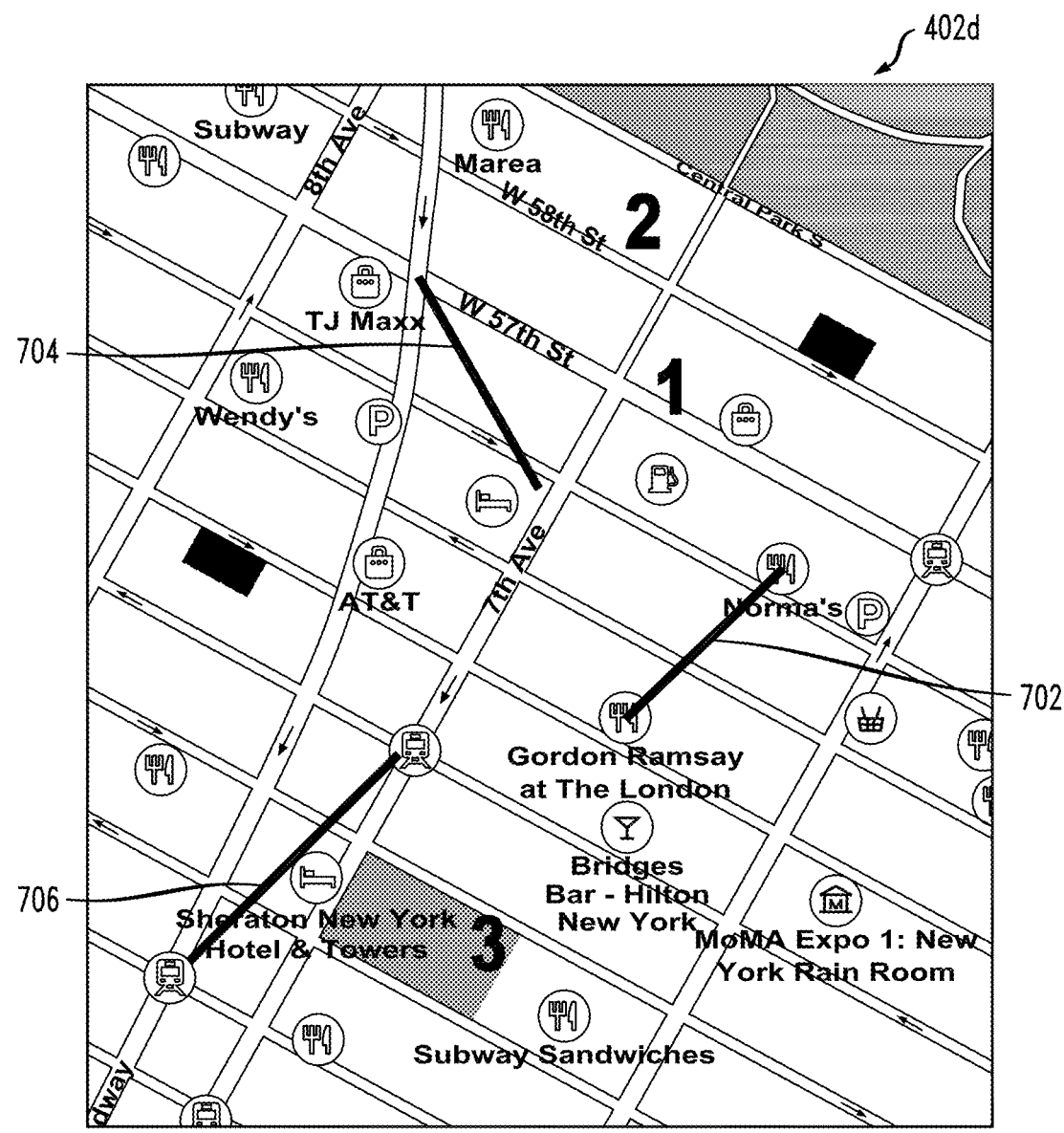
FIG. 7 is a diagram illustrating map-based authentication using lines, according to an example embodiment of the invention.

For instance, FIG. 7 is a diagram illustrating map-based authentication using lines, according to an example embodiment of the invention. By way of illustration, FIG. 7 depicts a street grid view 402d associated with the city view 402a (such as depicted in FIG. 4) of the selected map. Additionally, FIG. 7 depicts three lines, namely line 702, line 704 and 706, wherein each of the three lines connects two distinct POIs. Accordingly, in such an embodiment, in order to successfully authenticate, the user manually inputs each of the three lines (for example, via touching his/her finger or an implement to one POI and dragging his/her finger or the implement to the second POI of the given pair of POIs encompassed by the given line). One or more embodiments of the invention can also include incorporating and/or requiring a specific ordering of inputting a given line between a pair of POIs and/or a specific ordering of inputting multiple lines.

Figure 8:
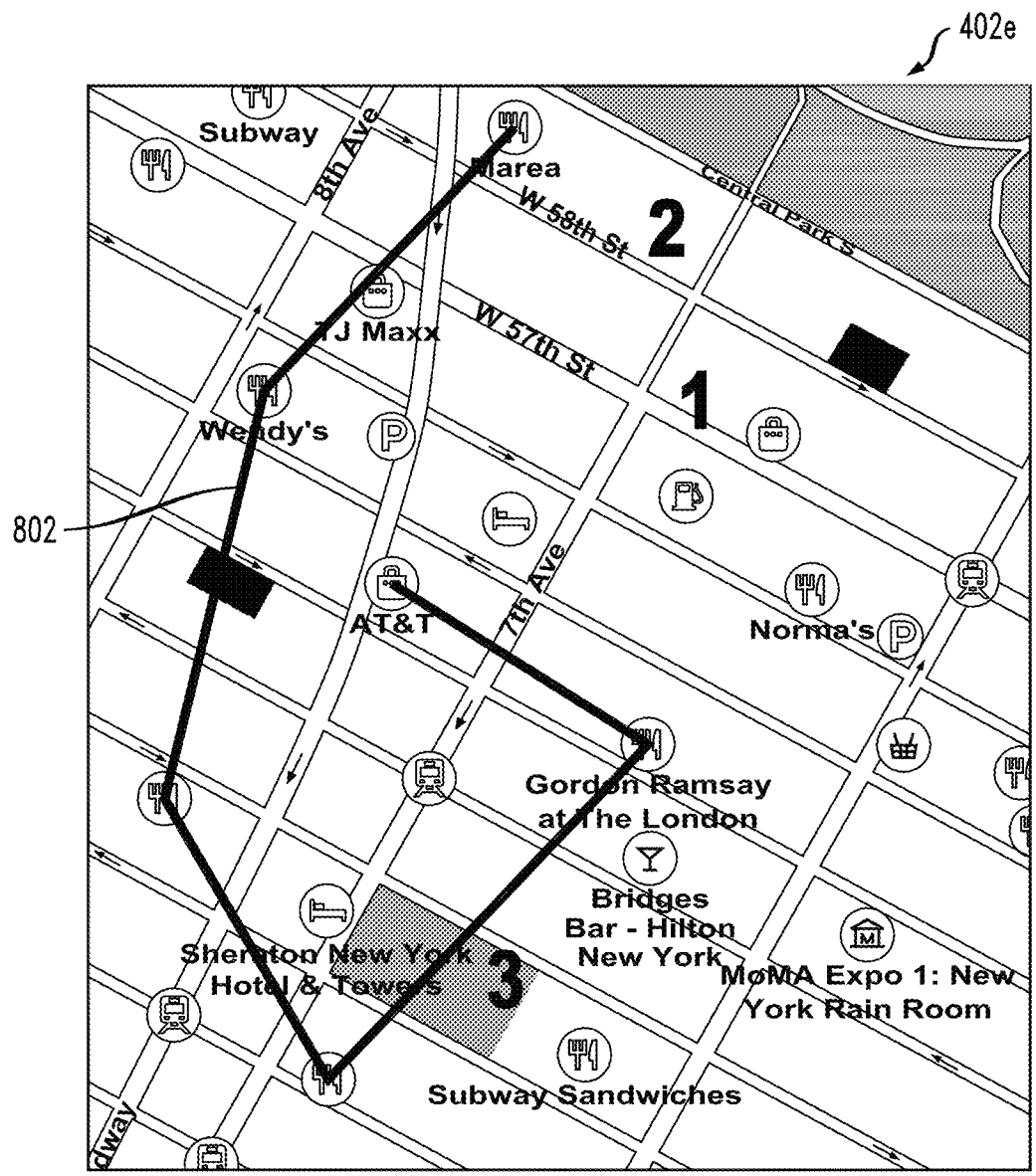
FIG. 8 is a diagram illustrating map-based authentication using gesture patterns, according to an example embodiment of the invention.

By way of additional example, FIG. 8 is a diagram illustrating map-based authentication using gesture patterns, according to an example embodiment of the invention. FIG. 8 depicts a street grid view 402e associated with the city view 402a (such as depicted in FIG. 4) of the selected map. Additionally, FIG. 8 depicts an extended gesture 802 that encompasses multiple POIs (namely, six POIs in the example illustrated in FIG. 8). Accordingly, in such an embodiment, in order to successfully authenticate, the user manually inputs the gesture 802 (for example, via touching his/her finger or an implement to one POI and dragging his/her finger or the implement to the second POI, then continuing to the third POI, then continuing to the fourth POI, then continuing to the fifth POI, and then continuing to and finish the gesture at the sixth POI). Such an embodiment can also include incorporating a requirement as to order of input for such a gesture.

In an embodiment such as depicted in FIG. 7 and/or FIG. 8, the interface of the computing device is to be designed with care so that a gesture to draw a line connecting POIs can be distinguished from a gesture to navigate through the map. Additionally, one or more embodiments of the invention can include incorporating a combination of one or more gesture-related POI selections and one or more isolated individual POI selections. Such embodiments can also include a chronological ordering component as well.

One or more embodiments of the invention can also include incorporating one or more behavioral factors or measures associated with user input patterns. Behavioral factors can include, for example, how a user holds his/her device (that is, device orientation), how a user zooms-in and navigates through a given map to find a given POI, the speed with which the user inputs the POIs, and the pressure of finger touches on the screen or interface. Such factors and/or measures can be recorded and monitored over time in order to build one or more behavioral biometric patterns. Additionally, in at least one embodiment of the invention, such patterns are verified against previous usage during the authentication stage to verify that not only the POI-related password is correct, but also that the POI-related password was entered by the enrolled user (as evidenced by a matching of behavioral biometric patterns).

Figure 9:
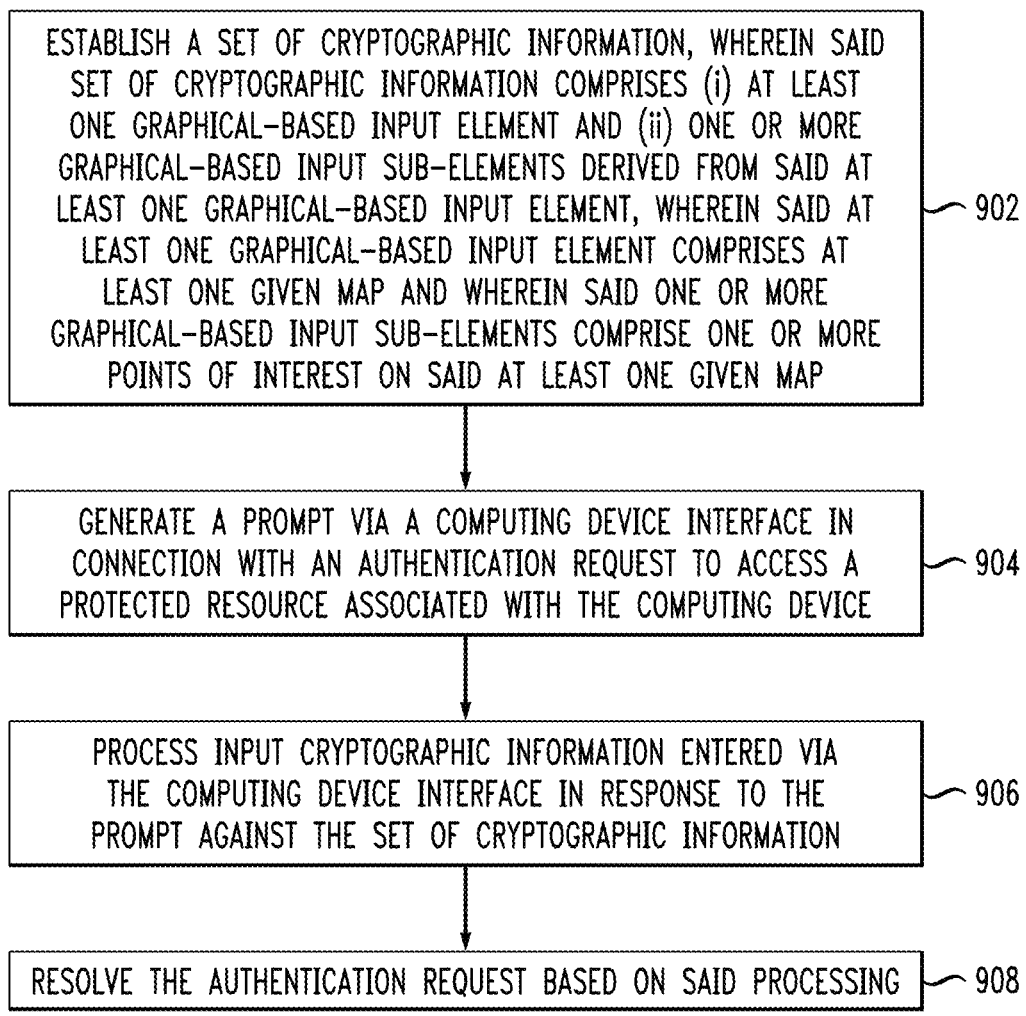
FIG. 9 is a flow diagram illustrating techniques according to an embodiment of the invention.

FIG. 9 is a flow diagram illustrating techniques according to an embodiment of the present invention. Step 902 includes establishing a set of cryptographic information, wherein said set of cryptographic information comprises (i) at least one graphical-based input element and (ii) one or more graphical-based input sub-elements derived from said at least one graphical-based input element, wherein said at least one graphical-based input element comprises at least one given map and wherein said one or more graphical-based input sub-elements comprise one or more points of interest on said at least one given map (for example, a municipal map, a regional map, a country map, and/or a world map).

The set of cryptographic information can include the one or more graphical-based input sub-elements selected in accordance with a given arrangement. The given arrangement can include, for example, a given chronological order, a first graphical-based input sub-element and a second graphical-based input sub-element connected by a line, and three or more graphical-based input sub-elements connected by a continuous sequence of two or more lines, wherein the continuous sequence of two or more lines can optionally connect the three or more graphical-based input sub-elements in a given order.

Step 904 includes generating a prompt via a computing device interface in connection with an authentication request to access a protected resource associated with the computing device. At least one embodiment of the invention includes randomizing an initial view on a selected map in connection with a generated prompt.

Step 906 includes processing input cryptographic information entered via the computing device interface in response to the prompt against the set of cryptographic information. The input cryptographic information can be entered via user manipulation of the computing device interface. User manipulation of the computing device interface can be implemented via at least one of a finger, an implement, a mouse and a pointer. Additionally, in at least one embodiment of the invention, user manipulation of the computing device interface can include implementation of an eye-tracking mechanism, wherein such a mechanism can be utilized to navigate through a map and/or select POIs. Further, user manipulation of the computing device interface can also include implementation of a voice-activation mechanism to select and/or navigate through a given map as well as to select POIs.

Also, user manipulation of the computing device interface can include zooming-in on a given area of the at least one map via user manipulation of the computing device interface to create a magnified view of the given area of the at least one map. Further, at least one embodiment of the invention includes enabling user navigation of the magnified view of the given area of the at least one map, wherein such user navigation can include displaying one or more different areas of the map in response to user manipulation of the computing device interface in one or more directions.

Step 908 includes resolving the authentication request based on said processing. The resolving step can include granting access to the protected resource associated with the computing device if the input cryptographic information matches the set of cryptographic information. Alternatively, the resolving step can include denying access to the protected resource associated with the computing device if the input cryptographic information does not match the set of cryptographic information.

Additionally, the techniques depicted in FIG. 9 can include determining a pattern associated with input behavior via the computing device interface over multiple iterations of the processing step, as well as supplementing the set of cryptographic information to include the pattern associated with input behavior.

Figure 10:
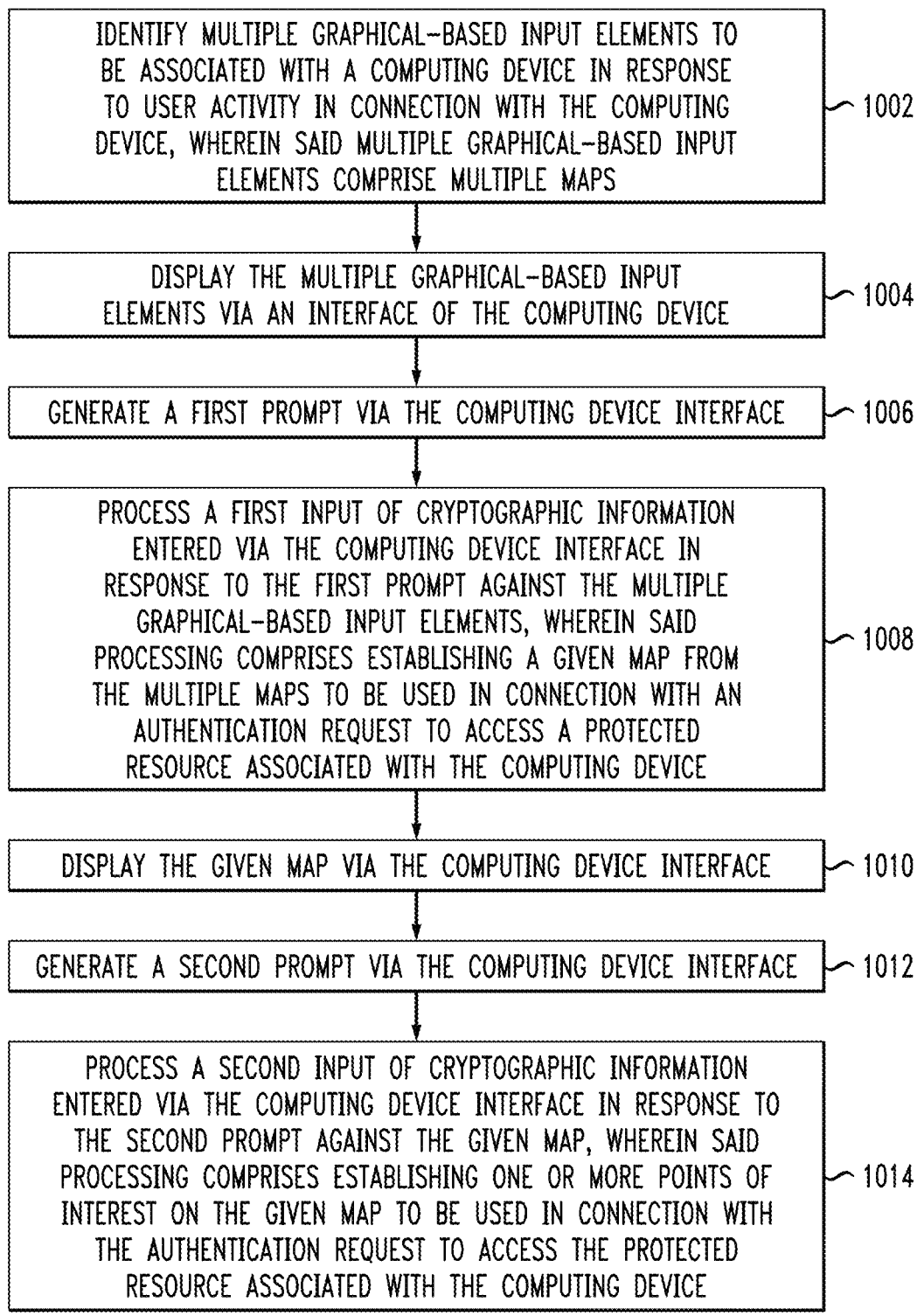
FIG. 10 is a flow diagram illustrating techniques according to an embodiment of the invention.

FIG. 10 is a flow diagram illustrating techniques according to an embodiment of the present invention. Step 1002 includes identifying multiple graphical-based input elements to be associated with a computing device in response to user activity in connection with the computing device, wherein said multiple graphical-based input elements comprise multiple maps. The multiple maps can be derived from at least one of (a) a local memory resident on the computing device, (b) a cloud storage service, and (c) an Internet source.

Step 1004 includes displaying the multiple graphical-based input elements via an interface of the computing device. Step 1006 includes generating a first prompt via the computing device interface. Step 1008 includes processing a first input of cryptographic information entered via the computing device interface in response to the first prompt against the multiple graphical-based input elements, wherein said processing comprises establishing a given map from the multiple maps to be used in connection with an authentication request to access a protected resource associated with the computing device.

Step 1010 includes displaying the given map via the computing device interface. Step 1012 includes generating a second prompt via the computing device interface. Step 1014 includes processing a second input of cryptographic information entered via the computing device interface in response to the second prompt against the given map, wherein said processing comprises establishing one or more points of interest on the given map to be used in connection with the authentication request to access the protected resource associated with the computing device, wherein the authentication request is to be granted if cryptographic information input in response to the authentication request matches the given map and the one or more points of interest on the given map. As described herein, establishing points of interest on the given map can include establishing points of interest on the given map in a given chronological order, as well as establishing a first point of interest on the given map and a second point of interest on the given map connected by a line.

Figure 11:
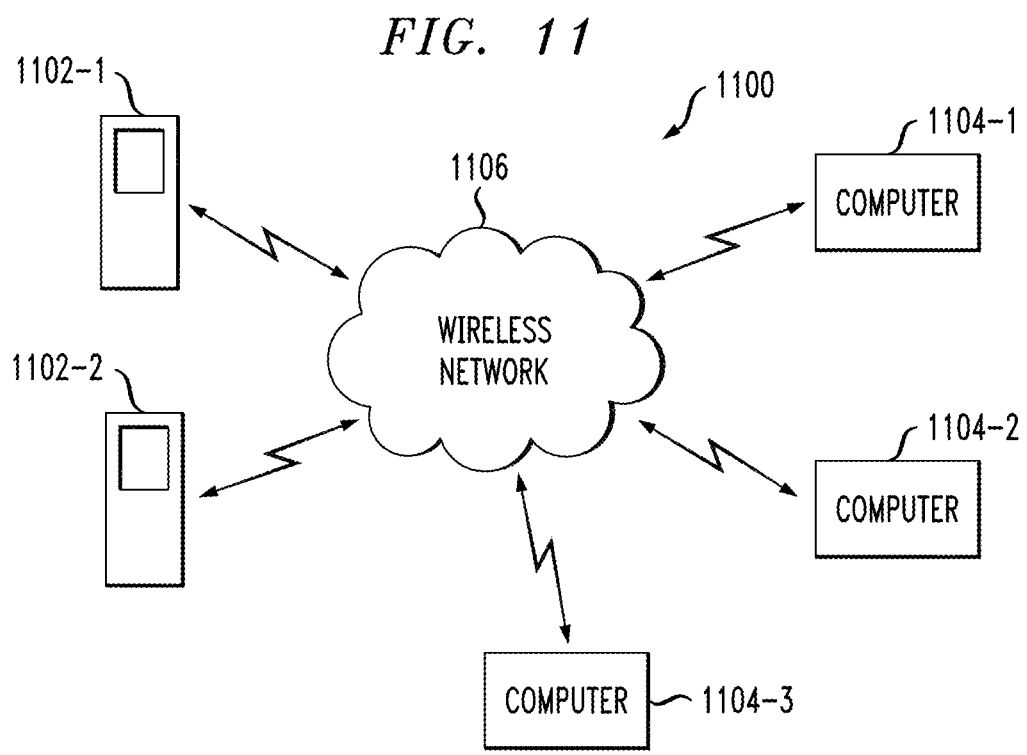
FIG. 11 shows an example embodiment of a communication system that may incorporate functionality of the type illustrated in at least one embodiment of the invention.

Cryptographic techniques of the type described herein may be implemented in a wide variety of different applications. An additional exemplary communication system application that may incorporate such techniques will now be described with reference to FIG. 11, which includes a communication system 1100 comprising a plurality of mobile telephones 1102-1 and 1102-2 and computers 1104-1, 1104-2 and 1104-3, configured to communicate with one another over a network 1106.

Any two or more of the devices 1102 and 1104 may correspond to computing devices configured to implement at least one embodiment of the invention, as previously described. It is to be appreciated that the techniques disclosed herein can be implemented in numerous other applications.

Aspects of the present invention are described herein with reference to flowchart illustrations and/or block diagrams of methods, apparatus (systems) and computer program products according to embodiments of the invention. It is to be appreciated that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As further described herein, such computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, as further detailed below, at least one embodiment of the invention includes an article of manufacture tangibly embodying computer readable instructions which, when implemented, cause a computer to carry out techniques described herein.

The computer program instructions may also be loaded onto a computer or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should be noted that the functions noted in the block may occur out of the order noted in the figures.

Accordingly, the techniques described herein can include providing a system, wherein the system includes distinct software modules, each being embodied on a tangible computer-readable recordable storage medium (for example, all modules embodied on the same medium, or each modules embodied on a different medium). The modules can run, for example, on a hardware processor, and the techniques detailed herein can be carried out using the distinct software modules of the system executing on a hardware processor.

Additionally, the techniques detailed herein can also be implemented via a computer program product that includes computer useable program code stored in a computer readable storage medium in a data processing system, wherein the computer useable program code was downloaded over a network from a remote data processing system. The computer program product can also include, for example, computer useable program code that is stored in a computer readable storage medium in a server data processing system, wherein the computer useable program code is downloaded over a network to a remote data processing system for use in a computer readable storage medium with the remote system.

As will be appreciated by one skilled in the art, aspects of the present invention may take the form of an entirely hardware embodiment, an entirely software embodiment (including firmware, resident software, micro-code, etc.) or an embodiment combining software and hardware aspects that may all generally be referred to herein as a "module" or "system."

An aspect of the invention or elements thereof can be implemented in the form of an apparatus including a memory and at least one processor that is coupled to the memory and operative to perform the techniques detailed herein. Also, as described herein, aspects of the present invention may take the form of a computer program product embodied in a computer readable medium having computer readable program code embodied thereon.

Figure 12:
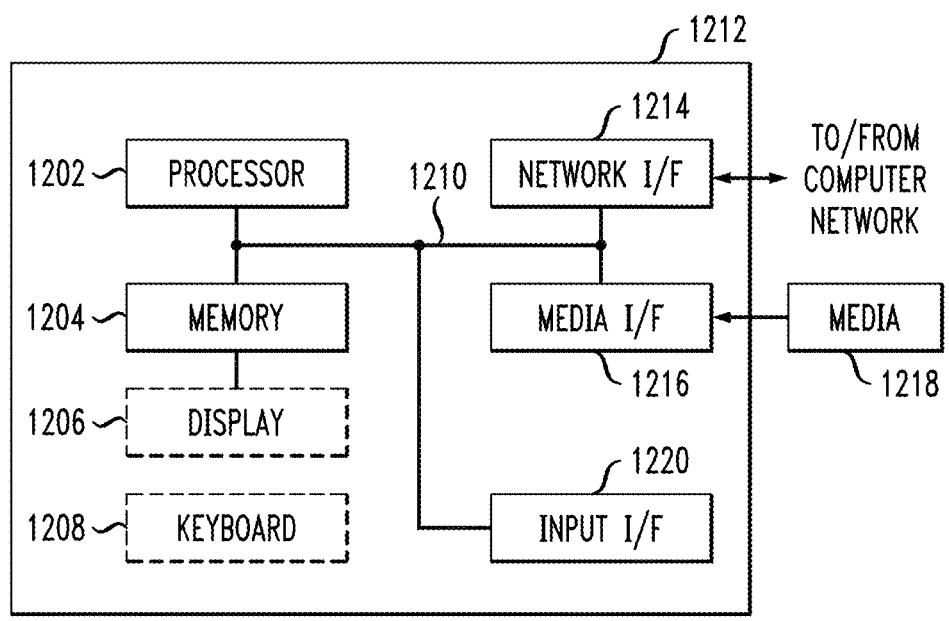
FIG. 12 is a system diagram of an exemplary computer system and/or client-side computing device on which at least one embodiment of the invention can be implemented.

By way of example, an aspect of the present invention can make use of software running on a general purpose computer. For instance, FIG. 12 is a system diagram of an exemplary computer system on which at least one embodiment of the invention can be implemented. As depicted in FIG. 12, an example implementation employs, for example, a processor 1202, a memory 1204, and an input/output interface formed, for example, by a display 1206 and a keyboard 1208. The term "processor" as used herein includes any processing device(s), such as, for example, one that includes a central processing unit (CPU) and/or other forms of processing circuitry. Additionally, the processor 1202 as shown may be viewed as representing, for example, CSCD 110, authentication servers 150 and protected resource 170. The term "memory" includes memory associated with a processor or CPU, such as, for example, random access memory (RAM), read only memory (ROM), a fixed memory device (for example, a hard drive), a removable memory device (for example, a diskette), a flash memory, etc. Further, the phrase "input/output interface," as used herein, includes a mechanism for inputting data to the processing unit (for example, a mouse, touch-screen, etc.) and a mechanism for providing results associated with the processing unit (for example, a printer).

The processor 1202, memory 1204, and input/output interface such as display 1206 and keyboard 1208 can be interconnected, for example, via bus 1210 as part of a data processing unit 1212. Suitable interconnections via bus 1210, can also be provided to an input interface 1220 (such as a touch-screen), a network interface 1214 (such as a network card), which can be provided to interface with a computer network, and to a media interface 1216 (such as a diskette or compact disc read-only memory (CD-ROM) drive), which can be provided to interface with media 1218.

Accordingly, computer software including instructions or code for carrying out the techniques detailed herein can be stored in associated memory devices (for example, ROM, fixed or removable memory) and, when ready to be utilized, loaded in part or in whole (for example, into RAM) and implemented by a CPU. Such software can include firmware, resident software, microcode, etc.

As noted above, a data processing system suitable for storing and/or executing program code includes at least one processor 1202 coupled directly or indirectly to memory elements 1204 through a system bus 1210. The memory elements can include local memory employed during actual implementation of the program code, bulk storage, and cache memories which provide temporary storage of at least some program code in order to reduce the number of times code must be retrieved from bulk storage during implementation. Also, input/output (I/O) devices such as keyboards 1208, displays 1206, and pointing devices, can be coupled to the system either directly (such as via bus 1210) or through intervening I/O controllers.

Network adapters such as network interface 1214 (for example, a modem, a cable modem or an Ethernet card) can also be coupled to the system to enable the data processing system to become coupled to other data processing systems or remote printers or storage devices through intervening private or public networks.

As used herein, a "server" includes a physical data processing system (such as system 1212 as depicted in FIG. 12) running a server program. It will be understood that such a physical server may or may not include a display and keyboard.

As noted, at least one embodiment of the invention can take the form of a computer program product embodied in a computer readable medium having computer readable program code embodied thereon. As will be appreciated, any combination of computer readable media may be utilized. The computer readable medium can include a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Examples include an electrical connection having one or more wires, a portable computer diskette, a hard disk, RAM, ROM, an erasable programmable read-only memory (EPROM), Flash memory, an optical fiber, a portable CD-ROM, an optical storage device, a magnetic storage device, and/or any suitable combination of the foregoing. More generally, a computer readable storage medium may be any tangible medium that can contain, or store a program for use by or in connection with an instruction execution system, apparatus, or device.

Additionally, a computer readable signal medium may include a propagated data signal with computer readable program code embodied therein, for example, in baseband or as part of a carrier wave. Such a propagated signal may take any of a variety of forms such as, for example, electromagnetic, optical, or a suitable combination thereof. More generally, a computer readable signal medium may be any computer readable medium that is not a computer readable storage medium and that can communicate, propagate, or transport a program for use by or in connection with an instruction execution system, apparatus, or device.

Program code embodied on a computer readable medium can be transmitted using an appropriate medium such as, for example, wireless, wireline, optical fiber cable, radio frequency (RF), and/or a suitable combination of the foregoing. Computer program code for carrying out operations in accordance with one or more embodiments of the invention can be written in any combination of at least one programming language, including an object oriented programming language, and conventional procedural programming languages. The program code may execute entirely on a user's computer, partly on a user's computer, as a stand-alone software package, partly on a user's computer and partly on a remote computer, or entirely on the remote computer or server. In the latter scenario, the remote computer may be connected to the user's computer through any type of network, including a LAN or a WAN, or the connection may be made to an external computer (for example, through the Internet using an Internet Service Provider).

In light of the above descriptions, it should be understood that the components illustrated herein can be implemented in various forms of hardware, software, or combinations thereof, for example, application specific integrated circuit(s) (ASICS), functional circuitry, an appropriately programmed general purpose digital computer with associated memory, etc.

Terminology used herein is for the purpose of describing particular embodiments only and is not intended to be limiting of the invention. For example, the singular forms "a," "an" and "the" are intended to include the plural forms as well, unless clearly indicated otherwise. It will be further understood that the terms "comprises" and/or "comprising," as used herein, specify the presence of stated features, integers, steps, operations, elements, and/or components, but do not preclude the presence or addition of another feature, integer, step, operation, element, component, and/or group thereof. Additionally, the corresponding structures, materials, acts, and equivalents of all means or step plus function elements in the claims are intended to include any structure, material, or act for performing the function in combination with other claimed elements as specifically claimed.

Also, it should again be emphasized that the above-described embodiments of the invention are presented for purposes of illustration only. Many variations and other alternative embodiments may be used. For example, the techniques are applicable to a wide variety of other types of communication systems and computing devices that can benefit from improved authentication schemes. Accordingly, the particular illustrative configurations of system and device elements detailed herein can be varied in other embodiments. These and numerous other alternative embodiments within the scope of the appended claims will be readily apparent to those skilled in the art.

What is claimed is:

1. A method comprising:
   establishing a set of cryptographic information, wherein said set of cryptographic information comprises (i) at least one graphical-based input element and (ii) one or more graphical-based input sub-elements derived from said at least one graphical-based input element, wherein said at least one graphical-based input element comprises at least one given map and wherein said one or more graphical-based input sub-elements comprise one or more points of interest on said at least one given map;
   generating a prompt via a computing device interface in connection with an authentication request to access a protected resource associated with the computing device;
   processing input cryptographic information entered via the computing device interface in response to the prompt against the set of cryptographic information, wherein said input cryptographic information is entered via user manipulation of the computing device interface, and wherein said user manipulation comprises zooming-in on a given area of the at least one given map via user manipulation of the computing device interface to create a magnified view of the given area of the at least one given map; and
   resolving the authentication request based on said processing.

2. The method of claim 1, wherein said user manipulation of the computing device interface comprises said user manipulation of the computing device interface via at least one of a finger, an implement, a mouse and a pointer.

3. The method of claim 1, further comprising:
   enabling user navigation of the magnified view of the given area of the at least one given map, wherein said user navigation comprises displaying one or more different areas of the at least one given map in response to user manipulation of the computing device interface in one or more directions.

4. The method of claim 1, wherein said set of cryptographic information comprises the one or more graphical-based input sub-elements selected in accordance with a given arrangement.

5. The method of claim 4, wherein said given arrangement comprises a given chronological order.

6. The method of claim 4, wherein said given arrangement comprises a first graphical-based input sub-element and a second graphical-based input sub-element connected by a line.

7. The method of claim 4, wherein said given arrangement comprises three or more graphical-based input sub-elements connected by a continuous sequence of two or more lines.

8. The method of claim 7, wherein said continuous sequence of two or more lines connects the three or more graphical-based input sub-elements in a given order.

9. The method of claim 1, wherein said at least one given map comprises at least one of a municipal map, a regional map, a country map, and a world map.

10. The method of claim 1, further comprising:
    determining a pattern associated with input behavior via the computing device interface over multiple iterations of said processing step.

11. The method of claim 10, further comprising:
    supplementing the set of cryptographic information to include the pattern associated with input behavior.

12. The method of claim 1, wherein said resolving comprises:
    granting access to the protected resource associated with the computing device if the input cryptographic information matches the set of cryptographic information; and
    denying access to the protected resource associated with the computing device if the input cryptographic information does not match the set of cryptographic information.

13. An article of manufacture comprising a processor-readable storage medium having processor-readable instructions tangibly embodied thereon which, when implemented, cause a processor to carry out the steps of the method of claim 1.

14. An apparatus comprising:
    a memory; and
    at least one processor coupled to the memory and configured to:
      establish a set of cryptographic information, wherein said set of cryptographic information comprises (i) at least one graphical-based input element and (ii) one or more graphical-based input sub-elements derived from said at least one graphical-based input element, wherein said at least one graphical-based input element comprises at least one given map and wherein said one or more graphical-based input sub-elements comprise one or more points of interest on said at least one given map;
      generate a prompt via a computing device interface in connection with an authentication request to access a protected resource associated with the computing device;
      process input cryptographic information entered via the computing device interface in response to the prompt against the set of cryptographic information, wherein said input cryptographic information is entered via user manipulation of the computing device interface, and wherein said user manipulation comprises zooming-in on a given area of the at least one given map via user manipulation of the computing device interface to create a magnified view of the given area of the at least one given map; and
      resolve the authentication request based on said processing.

15. The apparatus of claim 14, wherein the at least one processor is further configured to:
    enable user navigation of the magnified view of the given area of the at least one given map, wherein said user navigation comprises displaying one or more different areas of the at least one given map in response to user manipulation of the computing device interface in one or more directions.

16. The apparatus of claim 14, wherein said set of cryptographic information comprises the one or more graphical-based input sub-elements selected in accordance with a given arrangement.

17. The apparatus of claim 16, wherein said given arrangement comprises a given chronological order.

18. The apparatus of claim 16, wherein said given arrangement comprises a first graphical-based input sub-element and a second graphical-based input sub-element connected by a line.

19. The apparatus of claim 14, wherein the at least one processor is further configured to:
   determine a pattern associated with input behavior via the computing device interface over multiple iterations of said processing step.

20. The apparatus of claim 14, wherein the at least one processor is further configured to:
   supplement the set of cryptographic information to include the pattern associated with input behavior.

* * * * *